United States Patent
Ting (10) Patent No.: US 7,666,034 B2
(45) Date of Patent: *Feb. 23, 2010

(54) STACKED CARD CONNECTOR WITH DUAL EJECTORS

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/150,631

(22) Filed: Apr. 30, 2008

(65) Prior Publication Data

US 2008/0268682 A1      Oct. 30, 2008

(30) Foreign Application Priority Data

Apr. 30, 2007    (TW) .............................. 96115263 A (51) Int. Cl.
*H01R 24/00*    (2006.01)
(52) U.S. Cl. ...................................... 439/631; 439/159
(58) Field of Classification Search ................ 439/630, 439/157, 159, 160, 541.5, 631
See application file for complete search history.

(56) References Cited

U.S. PATENT DOCUMENTS

| | | | | |
|---|---|---|---|---|
| 5,643,001 A * | 7/1997 | Kaufman et al. ............. | 439/159 |
| 5,967,803 A * | 10/1999 | Ho ............................... | 439/79 |
| 6,071,149 A * | 6/2000 | Hara .......................... | 439/607 |
| 6,183,273 B1 * | 2/2001 | Yu et al. ...................... | 439/92 |
| 6,379,163 B1 * | 4/2002 | Yu ............................... | 439/95 |
| 6,991,480 B2 | 1/2006 | Kamata | |
| 7,052,316 B2 | 5/2006 | Tanigawa | |
| 7,090,537 B1 | 8/2006 | Nakamura | |
| 7,497,727 B2 * | 3/2009 | Ting ......................... | 439/541.5 |
| 7,566,241 B2 * | 7/2009 | Ting ......................... | 439/541.5 |
| 2006/0128189 A1 | 6/2006 | Kuo | |
| 2006/0196781 A1 | 9/2006 | Kimura | |
| 2008/0261423 A1 * | 10/2008 | Ting .......................... | 439/159 |
| 2008/0261424 A1 * | 10/2008 | Ting .......................... | 439/159 |
| 2008/0268683 A1 * | 10/2008 | Ting .......................... | 439/159 |
| 2008/0268684 A1 * | 10/2008 | Ting .......................... | 439/159 |
| 2008/0299807 A1 * | 12/2008 | Ting .......................... | 439/159 |
| 2009/0093167 A1 * | 4/2009 | Cheng ........................ | 439/660 |

\* cited by examiner

*Primary Examiner*—Edwin A. Leon
*Assistant Examiner*—Vanessa Girardi
(74) *Attorney, Agent, or Firm*—Andrew C. Cheng; Wei Te Chung; Ming Chieh Chang (57) ABSTRACT

A card connector (100) includes a first connector (10), a second connector (20), a first ejecting mechanism (6) and a second mechanism (5). The first connector defining a first receiving space (14) includes a first insulating housing (30) located in the receiving space and a plurality of first terminals (4) retained in the first insulating housing. The second connector is assembled with the first connector and includes a second insulating housing (22) equipped with the first insulating housing to define a second receiving space (220), and a plurality of second terminals (24) assembled with the second insulating housing and protruding into the second receiving space. The first insulating housing forms a base section (31) and a base seat (33) extending laterally from the base section, and the first ejecting mechanism and the second ejecting mechanism are mounted on the base seat.

18 Claims, 7 Drawing Sheets

STACKED CARD CONNECTOR WITH DUAL EJECTORS

BACKGROUND OF THE INVENTION

1. Field of the Invention

The present invention relates to a card connector, and particularly to a card connector comprising an ejecting mechanism.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for engaging the contact or terminal array of the card. Additionally, the connector always has an ejecting mechanism for ejecting the insertion card out of.

The prior art discloses a card connector having an insulating housing and a metal shell covering on the insulating housing. The metal shell is constructed as an L-shape, and the insulating housing has a triangular plate to guide a card inserted. On a lateral side of the card connector, an ejecting mechanism is mounted. The ejecting mechanism primarily includes a pushing bar allowing a user to operate, an ejecting bar for pushing a card, and a connecting bar connecting the pushing bar and the ejecting bar for transmitting a force between the pushing bar and the ejecting bar.

However, such card connector is mounted in an electronic equipment, and the connecting bar is fitted on the triangular plate. Therefore, overall height of the card connector is increased. Accordingly, more internal space of the electronic equipment is occupied.

In another prior art, a card connector has an L-shape shell defining a wider portion allowing a card to fit/eject and a narrower portion opposite to the wider portion, an insulating housing receiving a plurality of terminals, an arm portion located on a lateral side of the insulating housing, and an ejecting mechanism mounted on the arm portion. Although the overall height of the card connector is reduced, additional module of the arm portion for coupling with the ejecting mechanism make a high cost for a producer, and moreover, an assembly process of the card connector becomes more inconvenient.

Therefore, the present invention is directed to solving these various problems by providing a card connector which reduces the overall size of the connector and achieves a lower cost connector.

SUMMARY OF THE INVENTION

An object, therefore, of the invention is to provide a card connector reduced an overall size and cost.

In the exemplary embodiment of the invention, a card connector includes a first connector, a second connector, a first ejecting mechanism and a second mechanism. The first connector defines a first receiving space for a first card fitting/ejecting, a first insulating housing located one end of the receiving space, and a plurality of terminals retained in the first insulating housing to engage with the first card which is fitted in the first receiving space. The second connector is assembled with the first connector and includes a second insulating housing equipped with the first insulating housing to define a second receiving space for a second card fitting/ejecting, and a plurality of second terminals assembled with the second insulating housing and protruding into the second receiving space for engagement with the second card which is fitted in the second receiving space. Wherein the first insulating housing forms a base section and a base seat extending laterally from the base section, and the first ejecting mechanism and the second ejecting mechanism are mounted on the base seat at a same face thereof.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Referring to FIG. 1 to FIG. 7, the present invention provides a card connector 1 which is used for the connection with two cards having mutually different transmission speeds, such as an Express card, and a Smart card. The card connector 1 comprises a first connector 10 defining a first receiving space 14 for receiving a first card A, a second connector 20 stacked with the first connector 10 and defining a second receiving space 220 for receiving a second card B.

Figure 1:
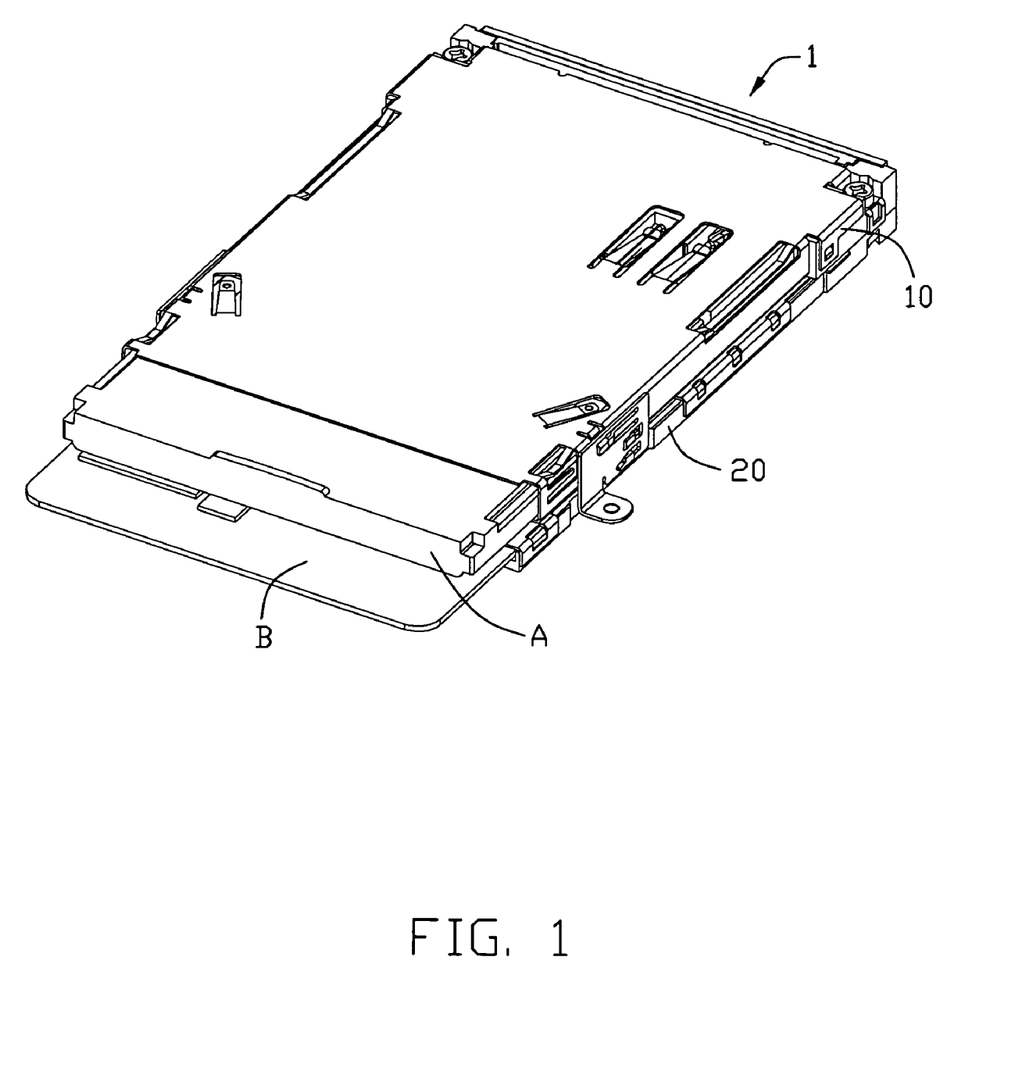
FIG. 1 is a perspective view of a card connector of present invention.
Figure 2:
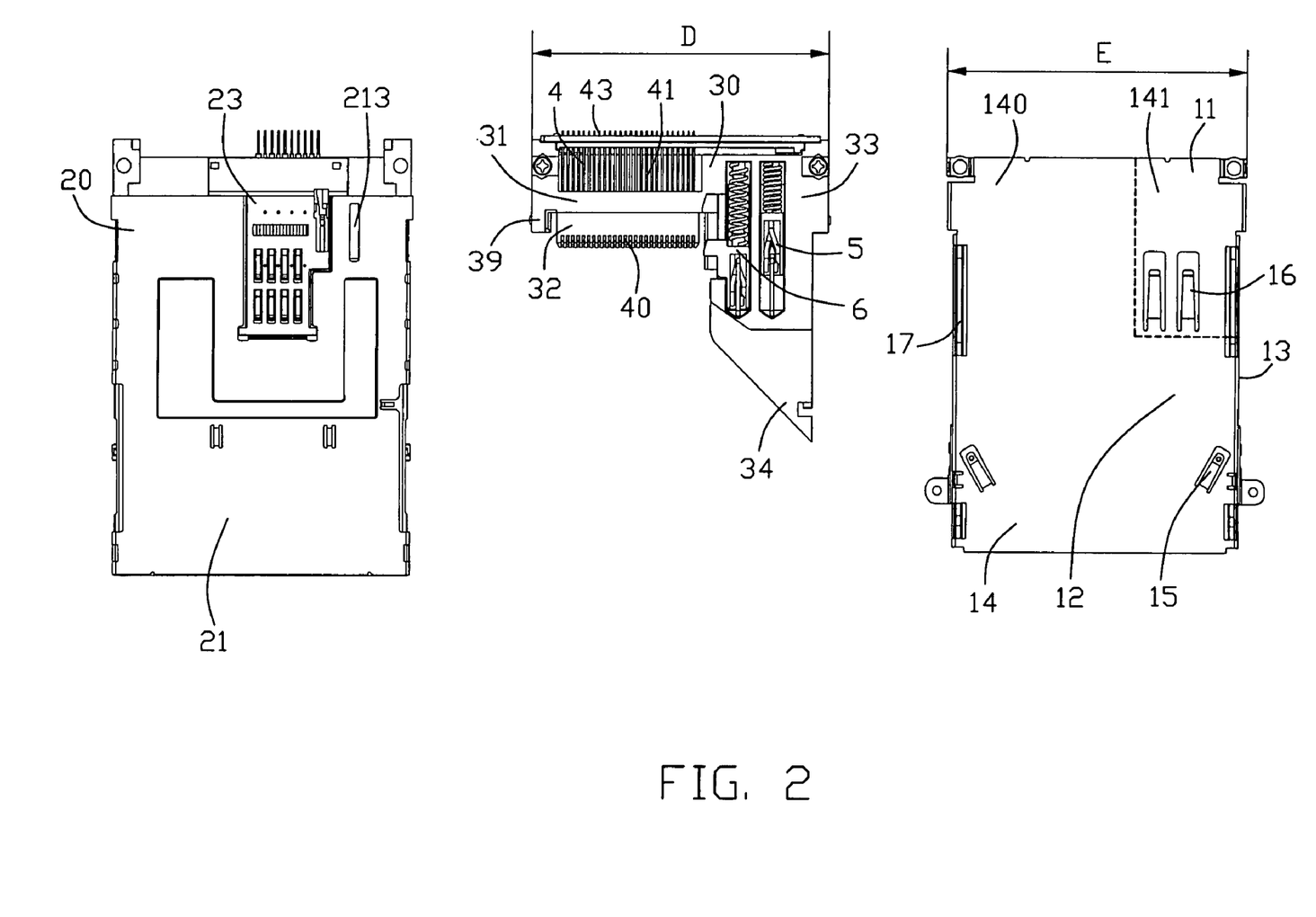
FIG. 2 is a top plan view of the card connector of present invention as shown in FIG 1.

As shown in FIG; 1 and FIG. 2, the first connector 10 comprises a first metal shell 11, a first insulating housing 30 covered by the first shell 1, a plurality of first terminals 4 protruding into the first receiving space 14 to engage with the first card A, a first ejecting mechanism 6 and a second ejecting mechanism 5 for ejecting the first card A and the second card B, respectively.

The first shell 11, approximately a rectangular shape in a top plan view, and an U shape in a front view, comprises a first top wall 12, and a pair of first lateral walls 13 extending downwardly from the first top wall 12. The first receiving space 14 is defined by the first top wall 12 associating with the first lateral walls 13 and divided into an L-shape card slot 140 to receive the first card A and a rectangular space 141, as shown in FIG. 2 surrounded by the broken line. When the first card A is received in the card slot 140, the rectangular space 141 is rightly left by a cut portion F of the first card A. The first top wall 12 has a pair of first elastic pieces 15, a pair of second elastic pieces 16, and a pair of first projecting portions 17. A sharp angle is defined between the elastic pieces 15 and an insertion direction of the card. The elastic pieces 15 are used for pressing on a metal part C (shown in FIG. 7) of the first card A serving as a grounding portion and a fastening portion. The first projecting portions 17 are provided to guide the first card inserted stably. The second elastic pieces 16 extend along the insertion direction of the card.

Figure 3:
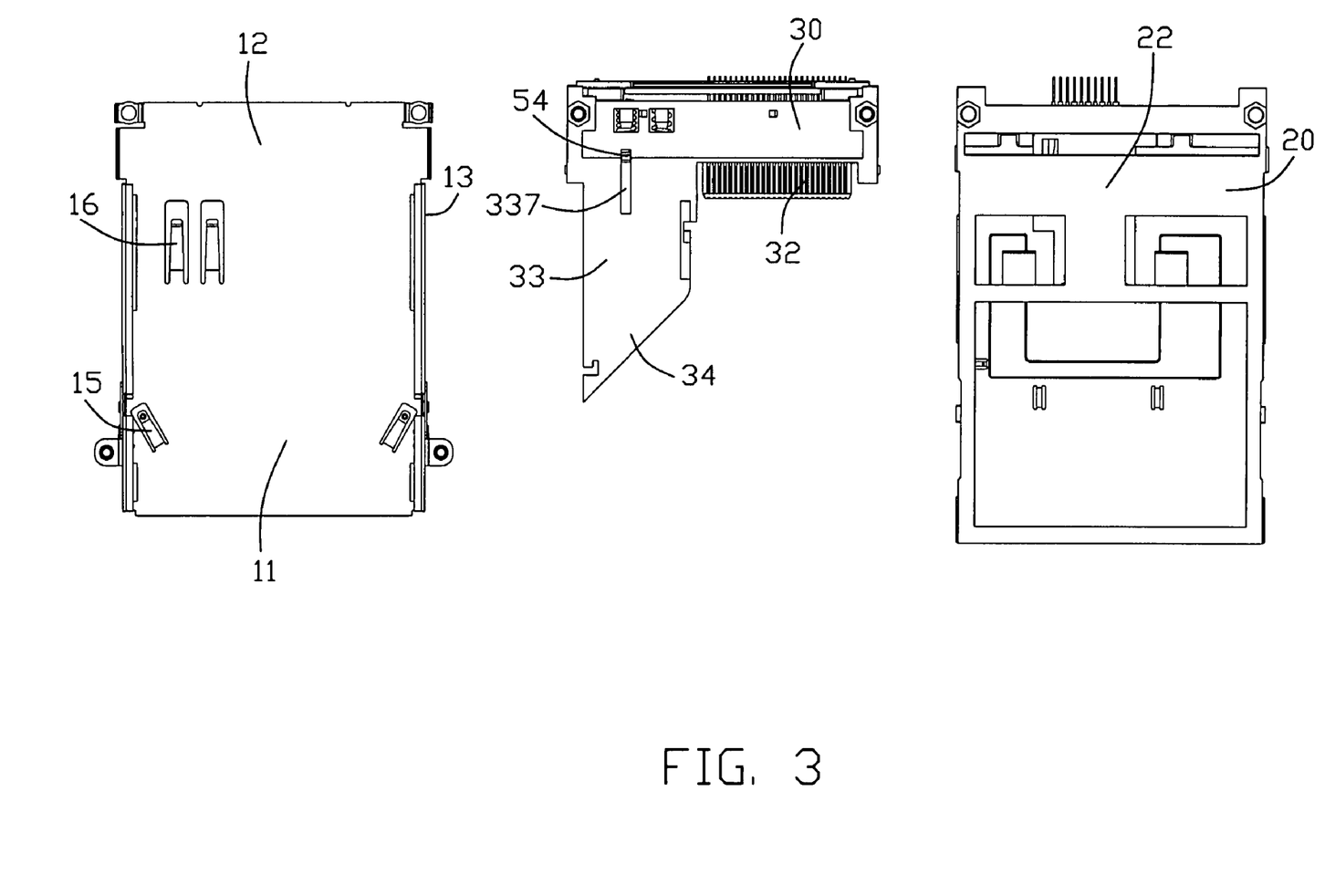
FIG. 3 is a bottom view of the card connector as shown in FIG. 2.
Figure 4:
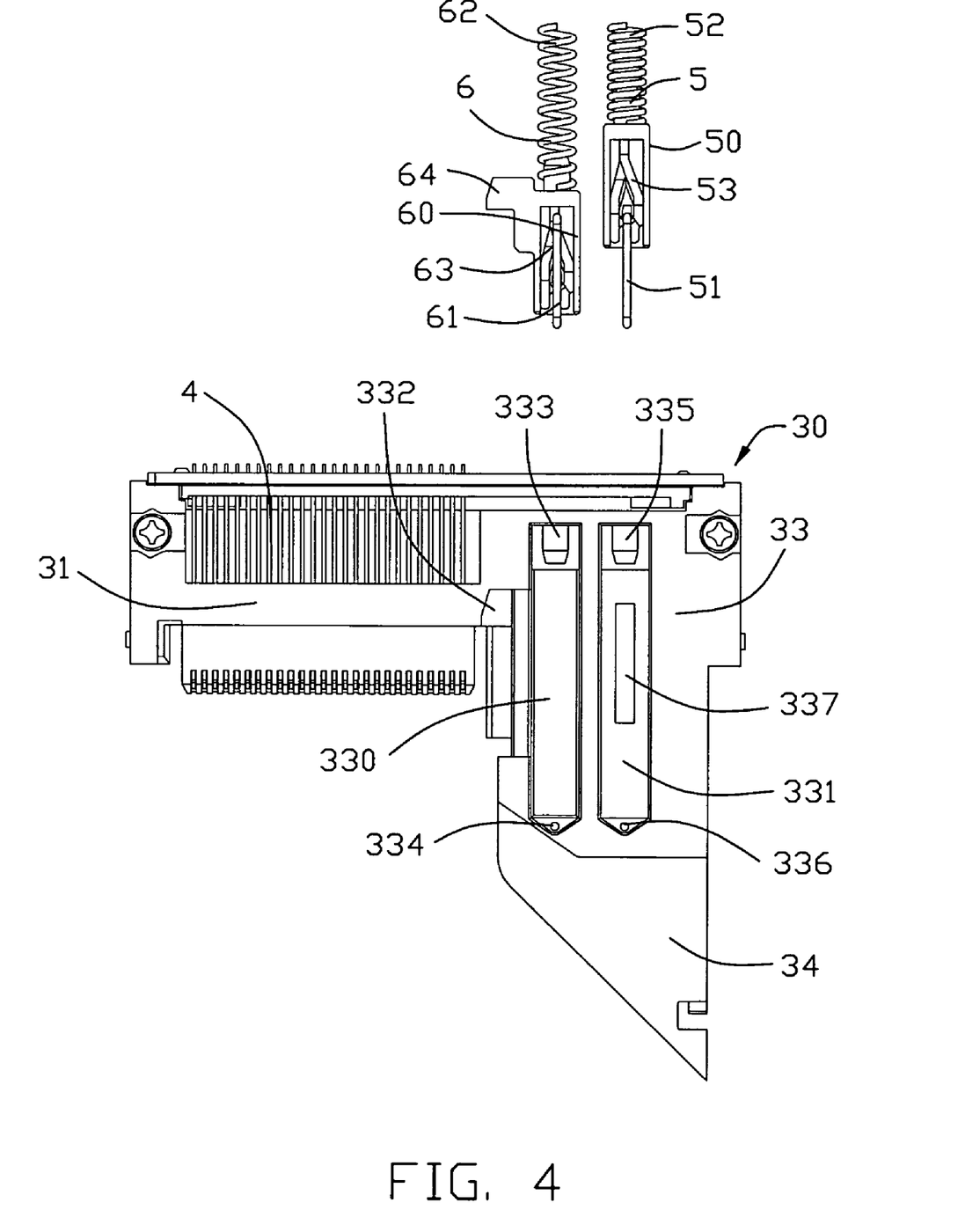
FIG. 4 is a top plan view of a first ejecting mechanism, a second ejecting mechanism and an insulating housing of the card connector according with present invention.

Referring to FIGS. 2 to FIG. 4, the first insulating housing 30, structured as an L-shape in a top plane view, comprises a base section 31, a base seat 33 extending laterally from the base section 31. Getting along a transverse direction perpendicular to the insertion direction of the card, a width D defined by the base section 31 associating with the base seat 33 is approximately equivalent to the width E of the metal shell 11. The base section 31 has a main portion (not labeled), an arm portion 39 at one end of the main portion, an engaging plate 32 extending from the main portion and perpendicular to the arm portion 39. In the engaging plate 32, a plurality of terminals 4 is received. Each terminal 4 comprises an engaging portion 40, a soldering portion 43 and a connecting portion 41 joining the engaging portion 40 with the soldering portion 43.

The base seat 33, designed approximately in a rectangular shape and longer than the base section 31 along the insertion direction of the card, has a first sliding groove 330 and a second sliding groove 331 parallel to the first sliding groove 330. The first sliding groove 330 and the second sliding groove 331, respectively, have a post 333, 335 at one end therein, and a position hole 334, 336 opposite to corresponding post 333, 335. Particularly, the first sliding groove 330 and the second sliding groove 331 has a first sliding channel 332 and a second sliding channel 337, respectively. The first sliding channel 332 is defined between the base section 31 and the first sliding groove 331 in the transverse direction, and the second sliding groove 337 is formed at the bottom of the second sliding groove 331 to communicating with the second receiving space 220. Moreover, in this embodiment of the present invention, the base section 31 has a triangular guiding portion 34 extending from the base seat 33 integrally. As shown in FIG. 4, the base section 31, the base seat 33, and the guiding portion 34 are integral.

As shown in FIG. 4, the first mechanism 6 and the second mechanism 5 are structured almost the same to each other and operated by an inserting card, and each comprises a ejecting member 60, 50 protruding into corresponding receiving space, a spring member 62, 52 for moving the ejecting member 60, 50 towards the card ejecting direction, a heart groove 63, 53 and a latch member 61, 51 sliding in the heart groove 63, 53 to overcome the spring member 62, 52 and placing the ejecting member 60, 50 in a desirable position. The first ejecting member 60 has a first pushing portion 64 extending laterally from one side of the first ejecting member 60 into the first receiving space 14, and the second ejecting member 50 has a second pushing portion 54 (shown in FIG. 6) extending downwardly from a bottom of the second ejecting member 50 into the second receiving space 220.

Figure 5:
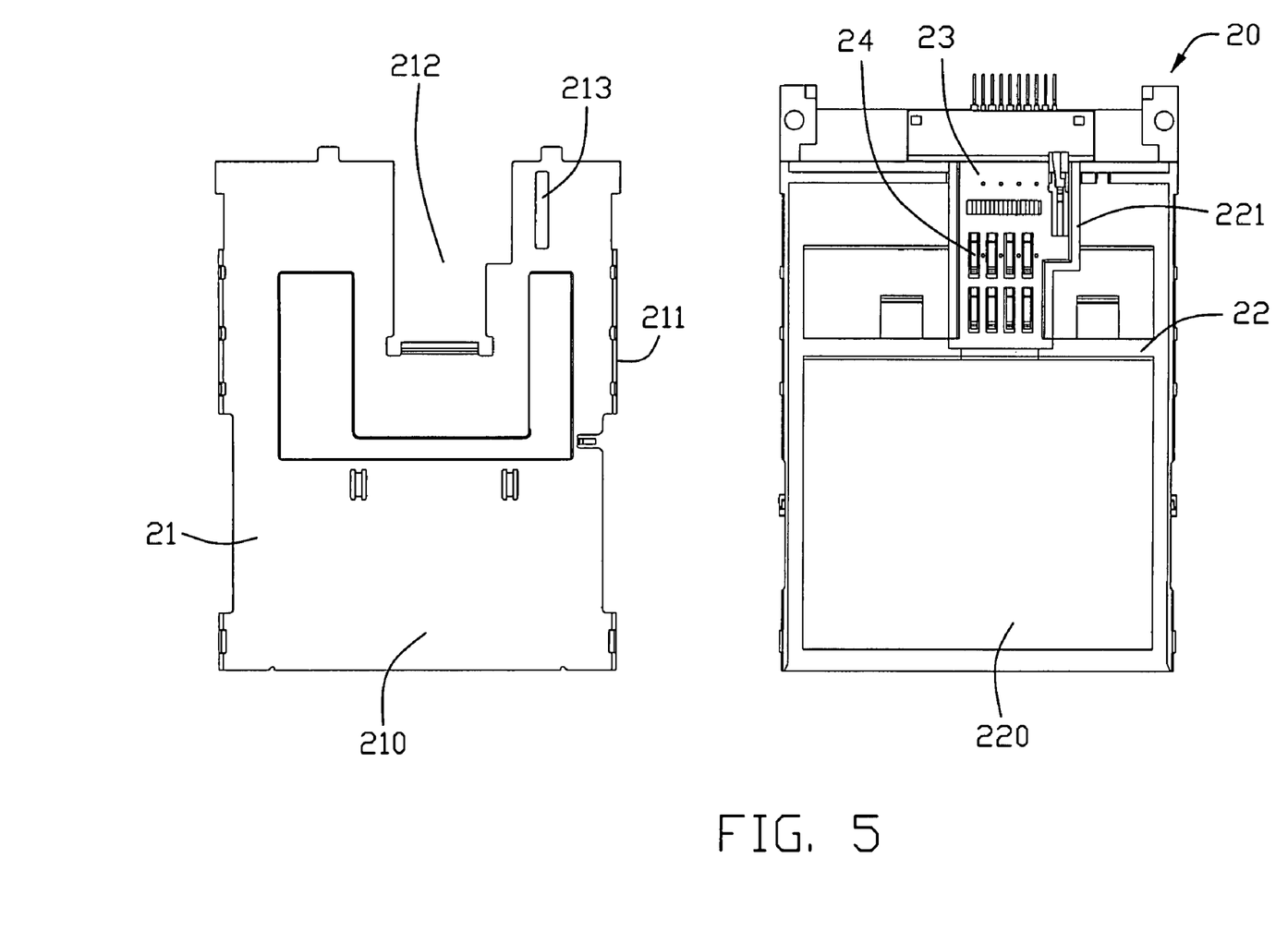
FIG. 5 is a top plan view of a second connector of the card connector according with present invention.

Together with FIG. 2, FIG. 3 and FIG. 5, the second connector 20 is placed under the first connector 10 respect to a printing circuit board (not shown) and comprises a second metal shell 21, a terminal module 23 aligned with the second shell 21, and a bottom plate 22 associating with the second shell 21 to define the second receiving space 220.

The second shell 21 is approximately rectangular shape, and comprises a second top wall 210, a pair of second side walls 211 extending downwardly from opposite sides of the top wall 210. The second top wall 210 has a fixing opening 212 in alignment with the terminal module 23, and a longitudinal groove 213 in accordance with the second slipping groove 337 of the second guiding groove 331.

The bottom plate 22 is constructed according with the second shell 21, and comprises a recess 221 to receiving the terminal module 23. In the terminal module 23, a plurality of second terminals 24 are retained and protrude upwardly into the second card slot 220 to engage with the second card B electrically.

Figure 6:
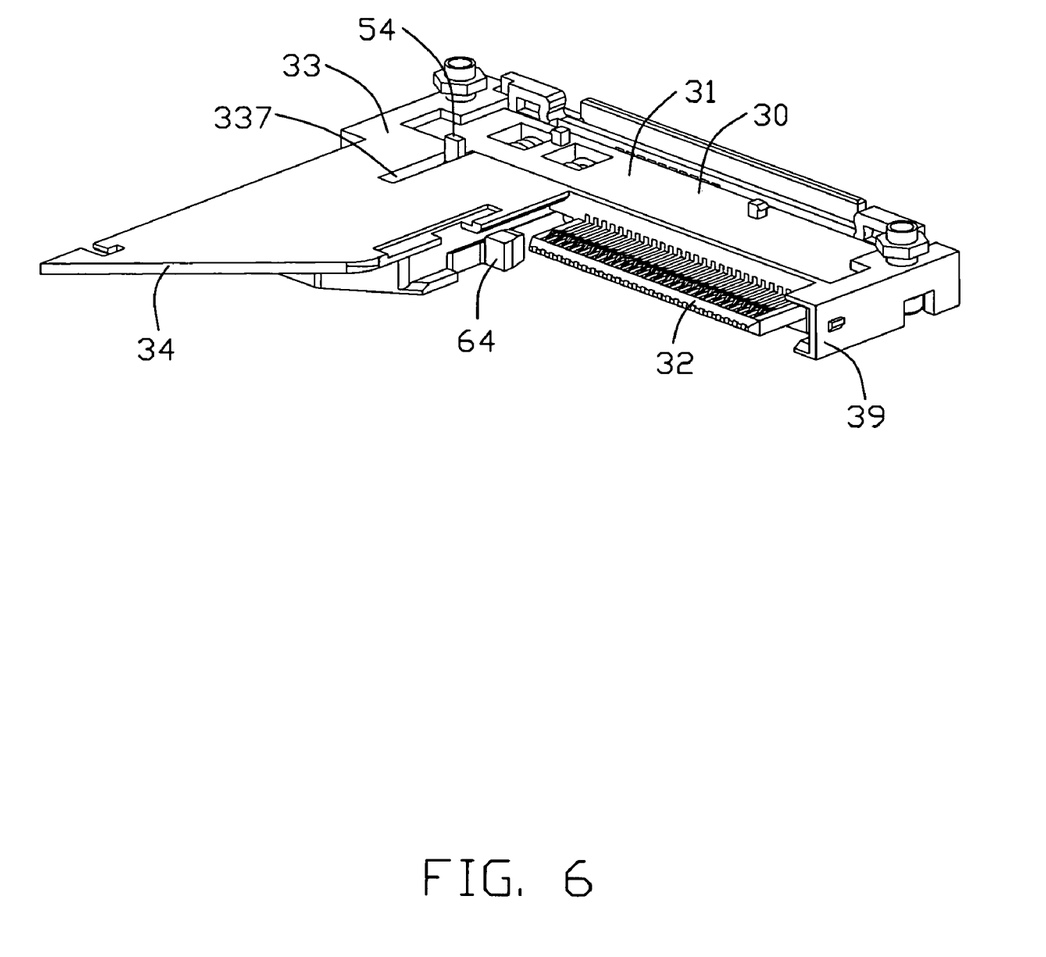
FIG. 6 is a perspective view of the insulating housing of the card connector.
Figure 7:
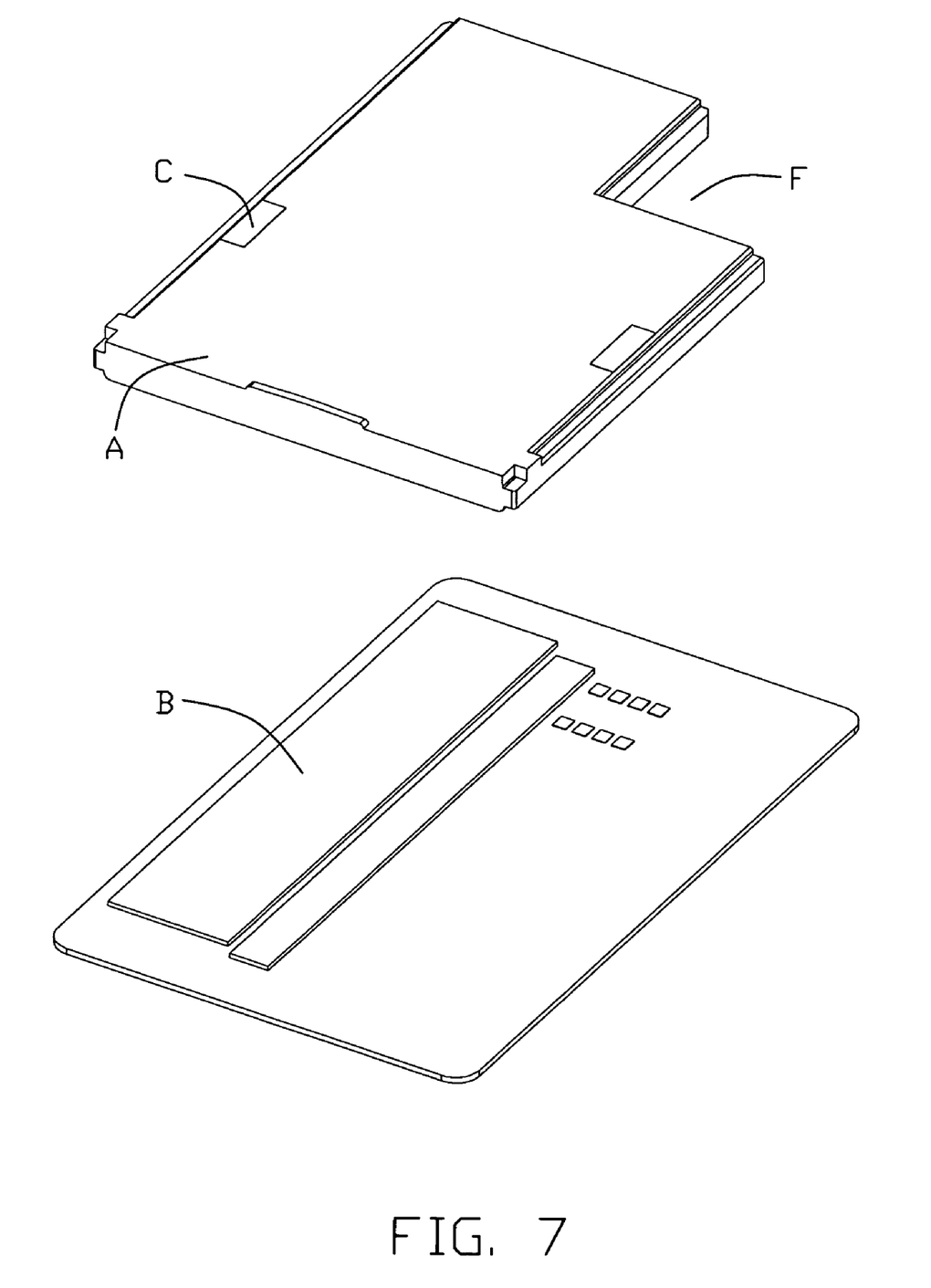
FIG. 7 is a perspective view of a first card and a second card allowed to be received in the card connector of present invention.

The relationship between the first ejecting mechanism 6, the second ejecting mechanism 5 and the first groove 330, the second groove 331 will be described in detail. The first ejecting mechanism 6 is mounted in the first groove 330 with the first pushing portion 64 protruding into the card slot 140, one end of the spring member 62 connecting the ejecting member 60 and the other aligned with the post 333, one end of the latch member 61 slipping in the heart groove 63 and the other end placed in the position hole 334. The second ejecting mechanism 5 is mounted in the second groove 331 in the same way as described of the first ejecting mechanism 6, except the second pushing portion 54 protruding downwardly into the second receiving space 220 by going through the second slipping channel 337 and the longitudinal groove 213 of the second metal shell 21, as shown in FIG. 2 and FIG. 6.

According with present invention, the first ejecting mechanism 6 and the second mechanism 5 is mounted in the first sliding groove 330 and the second sliding groove 331, more particularly, both the first sliding groove 330 and the second sliding groove 331 are formed on the base seat 33, and the base seat 33 is rightly fitted in the rectangular space 141. In such manner, it is needless to design another module to couple with the ejecting mechanisms. So a simple, convenient assembly process is achieved, accordingly, to save cost. On the other hand, the base seat 33 allows more ejecting mechanisms to be designed thereon, but do not take additional room as before. Besides, the first mechanism 6 and the second mechanism 5 are covered by the first shell 14 completely avoiding to being disposed out thereof and being interfered by other device.

In this embodiment of present invention, the card connector 1 is structured by vertically stacking two connectors that receive different cards. In another embodiment, a card connector is constructed by at least three connectors for receiving at least three cards, and one connector is designed as the first card connector 10 described above with at least two ejecting mechanisms mounted on a base seat 33 thereof, and the other two connectors are stacked vertically on opposite sides of said connector. The ejecting mechanisms protrude into corresponding card slot upwardly or downwardly to engaging with cards. Such structure also reduces overall size of the card connector, and save more space. In a third embodiment, a card connector comprises two card connectors arranged in a transverse direction or in a level, and two ejecting mechanisms are placed on a base seat formed between the two connectors, particularly, one of the connector should be designed with a card slot that has an L-space receiving space and a rectangular space, and the base seat is rightly received in the rectangular space to couple with ejecting mechanisms.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector comprising:
a first connector comprising a first receiving space for a first card fitting/ejecting, a first insulating housing located at one end of the receiving space, and a plurality of terminals retained in the first insulating housing to engage with the first card which is fitted in the first receiving space;
a second connector assembled with the first connector and comprising a second insulating housing equipped with the first insulating housing to define a second receiving space, a plurality of second terminals assembled with the second insulating housing and protruding into the second receiving space; and
a first ejecting mechanism and a second ejecting mechanism extending into the first receiving space and the second receiving space, respectively, to remove the first card and the second card; wherein
the first insulating housing forms a base section and a base seat extending laterally from the base section, and both the first ejecting mechanism and the second ejecting mechanism are mounted on the base seat.

2. The card connector as claimed in claim 1, wherein the first insulating housing further comprises a triangular guiding portion extending from the base seat in the first receiving space.

3. The card connector as claimed in claim 2, wherein the base section, the base seat, and the guiding portion are integral.

4. The card connector as claimed in claim 1, further comprising a first metal shell mounted on the first insulating housing and completely covering said first ejecting mechanism and said second ejecting mechanism.

5. The card connector as claimed in claim 4, wherein the first metal shell is approximately of a rectangular shape, a width of which is equal to a combined width of the base section and the base seat along a lateral direction.

6. The card connector as claimed in claim 4, wherein the first connector is stacked on the second connector.

7. The card connector as claimed in claim 6, further comprising a second metal shell between the first insulating housing and the second insulating housing cooperating wit the second insulating housing to define the second receiving space.

8. The card connector as claimed in claim 7, wherein the second terminals are retained in a terminal module equipped with the second metal shell, and the second insulating housing is covered by the second metal shell associating with the terminal module.

9. The card connector as claimed in claim 1, wherein the base seat defines two sliding grooves side by side, said first and second ejecting mechanism are disposed in the two sliding grooves, respectively.

10. The card connector as claimed in claim 9, wherein each of the first ejecting mechanism and the second ejecting mechanism comprises an ejecting member having a pushing portion protruding into corresponding receiving spaces, a spring member connecting with the ejecting member in a card inserting direction, a heart groove disposed on the ejecting member, and a latch member with one end movably received in the heart groove.

11. The stacked card connector as claimed in claim 10, wherein the first shell comprises a pair of elastic pieces pressing on the latch member of each ejecting mechanism, respectively.

12. The card connector as claimed in claim 10, wherein the pushing portions of the first ejecting mechanism and the second ejecting mechanism protrude into the first receiving space and the second receiving space along different directions, respectively.

13. The card connector as claimed in claim 12, wherein the pushing portion of the first ejecting mechanism extends along a widthwise direction of the connector, and the pushing portion of the second ejecting mechanism extends along a thickness direction of the connector.

14. A card connector comprising,
a first connector comprising a first metal shell defining a first receiving space for a first card fitting/ejecting, a first insulating housing disposed in one end of the first receiving space, a plurality of first terminals retained in the first insulating housing and protruding into the first receiving space to engage with the first card;
a second connector assembled with the first connector and comprising a second insulating housing cooperating with one face of the first insulating housing to define a second receiving space for a second card fitting/ejecting, and a plurality of second terminals mating with the second insulating housing and protruding into the second receiving space for engagement with the second card which is fitted in the second receiving space; and
a first ejecting mechanism and a second ejecting mechanism disposed in the first receiving space side by side.

15. The card connector as claimed in claim 14, wherein the first receiving space defines an L-shape card slot and a rectangular receiving space at a corner thereof, the first insulating housing is retained in a narrower end of the L-shape card slot beside the rectangular receiving space.

16. The card connector as claimed in claim 15, wherein the first ejecting mechanism and the second ejecting mechanism are received in the rectangular receiving space.

17. A card connector assembly comprising:
a first connector defining a first insulative housing with a plurality of first contacts therein and an L-shaped first card receiving space in front of the first insulative housing, a base seat unitarily formed with the first housing beside said L-shaped receiving space;
a second connector having a stacked relationship with the first connector and defining a second insulative housing with a plurality of second contacts therein and a rectangular second card receiving space in front of the second insulative housing;
first and second ejection mechanism disposed side by side on the base seat and respectively equipped with first and second pushing portions respectively protruding into the first and the second card receiving spaces.

18. The card connector assembly as claimed in claim 17, wherein the first card receiving space plus the base seat is generally dimensionally equal to the second receiving space.

* * * * *